US007207491B2

(12) United States Patent
Lubow

(10) Patent No.: US 7,207,491 B2
(45) Date of Patent: Apr. 24, 2007

(54) SYSTEM AND METHOD FOR GENERATING A COMBINED BAR CODE IMAGE

(75) Inventor: Allen Lubow, Brooklyn, NY (US)

(73) Assignee: International Barcode Corporation, New York, NY (US)

( * ) Notice: Subject to any disclaimer, the term of this patent is extended or adjusted under 35 U.S.C. 154(b) by 39 days.

(21) Appl. No.: 10/922,411

(22) Filed: Aug. 20, 2004

(65) Prior Publication Data
US 2005/0109846 A1 May 26, 2005

Related U.S. Application Data

(63) Continuation-in-part of application No. 10/497,636, filed as application No. PCT/US02/38558 on Dec. 2, 2002, and a continuation-in-part of application No. 10/495,034, filed as application No. PCT/US02/36371 on Nov. 12, 2002.

(60) Provisional application No. 60/528,046, filed on Dec. 8, 2003, provisional application No. 60/334,570, filed on Nov. 30, 2001, provisional application No. 60/347,561, filed on Nov. 9, 2001.

(51) Int. Cl.
G06K 7/10 (2006.01)
(52) U.S. Cl. .............................. 235/462.01; 235/462.09
(58) Field of Classification Search ............ 235/462.01, 235/492.09, 462.09, 454, 487
See application file for complete search history.

(56) References Cited

U.S. PATENT DOCUMENTS 4,590,366 A 5/1986 Rothfjell
4,777,357 A 10/1988 Harada et al.
4,795,281 A 1/1989 Ulinski, Sr. et al.
4,811,408 A 3/1989 Goldman
4,889,367 A 12/1989 Miller (Continued)

FOREIGN PATENT DOCUMENTS

EP 0921675 A2 6/1999

(Continued)

OTHER PUBLICATIONS

International Search Report and Written Opinion mailed Oct. 24, 2005 in corresponding International Application No. PCT/US04/41084.

(Continued)

Primary Examiner—Daniel St. Cyr
(74) Attorney, Agent, or Firm—Davidson Berquist Jackson & Gowdey LLP

(57) ABSTRACT

A system and method is provided that includes generating a combined bar code symbol and image that is readable by a bar code scanner device. The system comprises a computer program that provides an image and a bar code symbol and combines the bar code symbol with the image such that the bar code symbol is readable by the bar code scanner device. The system processes the image and bar code symbol by comparing the properties corresponding to the image, the bar code symbol (e.g., color values), and properties corresponding to the bar code scanner sensitivity values associated with the bar code scanner device. The processed bar code symbol that is combined with the processed image is readable by the bar code scanner device.

42 Claims, 12 Drawing Sheets

U.S. PATENT DOCUMENTS

| | | |
|---|---|---|
| 5,235,167 A | 8/1993 | Dvorkis et al. |
| 5,337,361 A * | 8/1994 | Wang et al. .................. 380/51 |
| 5,522,623 A | 6/1996 | Soules et al. |
| 5,563,401 A | 10/1996 | Lemelson |
| 5,841,886 A | 11/1998 | Rhoads |
| 5,913,542 A | 6/1999 | Belucci et al. |
| 5,971,587 A | 10/1999 | Kato et al. |
| 6,032,861 A | 3/2000 | Lemelson et al. |
| 6,100,804 A | 8/2000 | Brady et al. |
| 6,318,636 B1 | 11/2001 | Reynolds et al. |
| 6,342,839 B1 | 1/2002 | Curkendall et al. |
| 6,354,494 B1 | 3/2002 | Marcus |
| 6,409,401 B1 | 6/2002 | Petteruti et al. |
| 6,415,978 B1 | 7/2002 | McAllister |
| 6,463,039 B1 | 10/2002 | Ricci et al. |
| 6,494,367 B1 | 12/2002 | Zacharias |
| 6,614,392 B2 | 9/2003 | Howard |
| 6,616,047 B2 | 9/2003 | Catan |
| 6,637,649 B2 | 10/2003 | Walsh |
| 6,646,554 B1 | 11/2003 | Goff et al. |
| 6,685,094 B2 | 2/2004 | Cameron |
| 7,025,269 B2 | 4/2006 | Marshall |
| 2001/0045460 A1 | 11/2001 | Reynolds et al. |
| 2004/0000787 A1 | 1/2004 | Vig et al. |
| 2005/0072846 A1 | 4/2005 | Lubow |
| 2005/0109846 A1 | 5/2005 | Lubow |
| 2005/0161512 A1 | 7/2005 | Jones et al. |
| 2005/0161515 A1 | 7/2005 | Lubow |
| 2005/0199723 A1 | 9/2005 | Lubow |

FOREIGN PATENT DOCUMENTS

| | | |
|---|---|---|
| JP | 9-231338 | 9/1997 |
| WO | WO 01/67375 A1 | 9/2001 |
| WO | WO 03/040804 | 5/2003 |
| WO | WO 03/049007 | 6/2003 |

OTHER PUBLICATIONS

International Search Report mailed Apr. 10, 2003 in International Application No. PCT/US02/36371.

International Search Report mailed Apr. 8, 2003 in corresponding International Application No. PCT/US02/38558.

Office Action mailed Dec. 23, 2005 in corresponding European Application No. 02791236.9-2210.

Office Action mailed Jun. 3, 2005 in corresponding European Application No. 02791236.9-2210.

Supplemental European Search Report issued Mar. 8, 2005 in corresponding European Application No. 02791236.9-2210.

Supplemental European Search Report mailed Jan. 23, 2007, in corresponding European Application No. 02786862.9-2211.

* cited by examiner

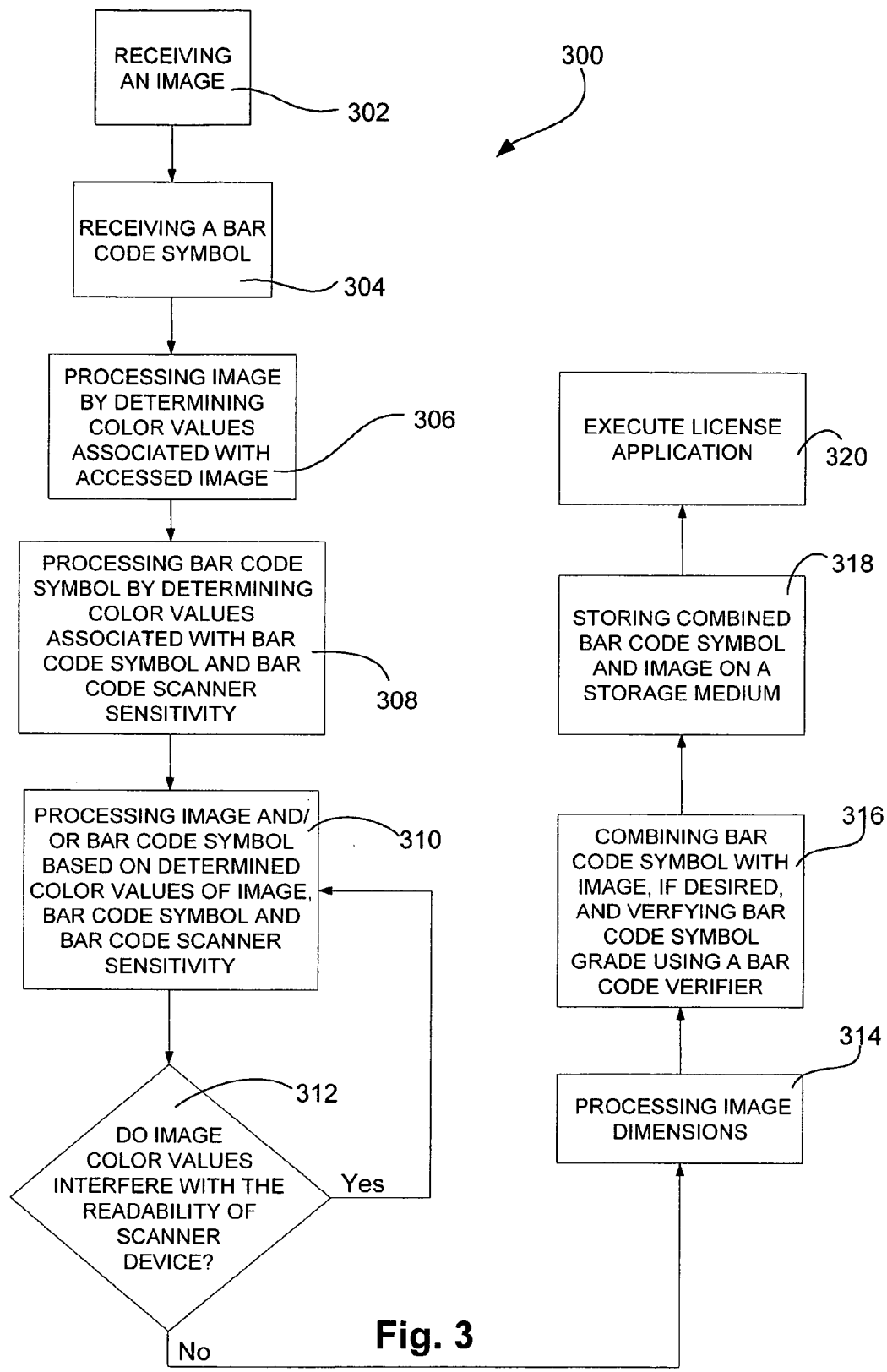

SYSTEM AND METHOD FOR GENERATING A COMBINED BAR CODE IMAGE

CROSS-REFERENCE TO RELATED APPLICATIONS

This application is a continuation-in-part of and claims the benefit under 35 U.S.C. § 120 from patent application Ser. No. 10/497,636, filed Nov. 3, 2004 which is a national stage application of and claims the benefit under U.S.C. § 365(a) from international application no. PCT/US 02/38558, filed Dec. 2, 2002, which claims the benefit under 35U.S.C. §119(e) from provisional patent application No. 60/334,570, filed Nov. 30, 2001, the contents of which are incorporated by reference herein in their entirety. The application is also a continuation-in-part of and claims the benefit under 35 U.S.C. §120 from patent application Ser. No. 10/495,034, filed Nov. 4, 2004, which is a national stage application of and claims the benefit under U.S.C. §365(a) from international application no. PCT/US02/36371, filed Nov. 12, 2002, which claims the benefit under 35 U.S.C. § 119(e) from provisional patent application No. 60/347,561, filed Nov. 9, 2001, the contents of which are incorporated by reference herein in their entirety. This application also claims the benefit under 35 U.S.C. § 119(e) from provisional patent application No. 60/528,046, filed Dec. 8, 2003, the contents of which is also incorporated by reference herein its entirety.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The present invention relates generally to a system and method for combining an image or images such as logos, graphics, text, "wall paper", etc. with a bar code symbol, and more particularly to providing such an image or images within a bar code symbol such that the bar code symbol can be read in the presence of the image(s).

SUMMARY OF THE INVENTION

According to an embodiment of the present invention, a method provides a composite image comprising a bar code symbol and another image, where the bar code symbol is machine readable by an optical scanning device. In accordance with embodiments of the invention, one or more properties of the bar code symbol, the other image and/or and the optical scanning device are analyzed, e.g., operation of the optical scanning device with respect to at least one optical property of the bar code symbol and/or the other image. For example, the following, and/or combinations thereof, may be analyzed: the color(s) of the bar code symbol and image and the color sensitivity of the optical scanning device; the contrast between elements of the bar code symbol and between elements of the bar code symbol and the other image, and the contrast sensitivity of the optical scanning device; the relative sizes and/or positions of the bar code symbol and the image and the resolution and/or sensitivity of the optical scanning device with respect to such size and position and/or; etc.

Based on an analysis, such as the foregoing, which are exemplary, embodiments of the invention provide for the bar code symbol and the other image to be combined into the composite image such that the bar code symbol can be machine read by the optical scanning device and the image can be optically discerned by a human (e.g., in a preferred embodiment, with the naked eye).

According to an embodiment of the present invention, a method of providing a composite, image comprising a bar code symbol and an other image is provided. The method comprises analyzing the operation of an optical scanning device at least with respect to at least one optical property of the bar code symbol and the other image, and combining the bar code symbol and the other image into the composite image in consideration of the analyzing of the operation of the optical scanning device, such that the bar code symbol can be machine read by the optical scanning device and the other image can be optically discerned by a human.

According to another embodiment of the present invention, a method is provided where the analyzing of the operation of the optical scanning device comprises analyzing the color sensitivity of the optical scanning device with respect to at least one color. Combining the bar code symbol and the other image comprises selecting a color or colors of the bar code symbol and the other image such that the bar code symbol can be machine read by the optical scanning device and the other image can be optically discerned by a human.

According to another embodiment of the present invention, a method is provided, where the analyzing of the operation of the optical scanning device comprises analyzing contrast sensitivity of the optical scanning device. Combining the bar code symbol and the other image comprises selecting a contrast between elements of the bar code symbol and between elements of the bar code symbol and other image such that the bar code symbol can be machine read by the optical scanning device and the other image can be optically discerned by a human.

According to yet another embodiment of the present invention, a method is provided, where the analyzing of the operation of the optical scanning device comprises analyzing sensitivity of the optical scanning device to relative sizing and position of the bar code symbol and the other image. Combining the bar code symbol and the other image comprises selecting relative sizing and positioning of the bar code symbol and the other image such that the bar code symbol can be machine read by the optical scanning device and the other image can be discerned by a human.

According to another embodiment of the present invention, a method of generating a composite image comprising an other image and a bar code symbol having a plurality of bars and a background region that is readable by a bar code scanner device is provided. The method comprises processing color values associated with the other image and the bar code symbol, and bar code scanner sensitivity values associated with the bar code scanner device. The bar code symbol is combined with the other image, where the bar code symbol having the processed color values that is combined with the other image having the processed color values is readable by the bar code scanner device.

According to another embodiment of the present invention, a method of providing a user with an opportunity to purchase a combined bar code symbol and image is provided, wherein the combined bar code symbol and image are readable by a bar code scanner device. The method comprises receiving an other image and receiving a bar code symbol having a plurality of bars and a background region. Color values associated with the other image, the bar code symbol, and bar code scanner sensitivity values associated with the bar code scanner device are processed. The plurality of bars and the background region associated with the bar code symbol is combined with the other image, wherein the bar code symbol having the processed color values that is combined with the other image having the processed color values is readable by the bar code scanner device. A license purchasing screen is provided for prompting the user to purchase a license associated with the combined bar code symbol and other image upon selection confirmation by the user.

According to another embodiment of the present invention, a method of marketing a product is provided, where the method comprises receiving a bar code symbol that corresponds to a business entity. The bar code symbol has an image associated with the product, wherein the bar code symbol is combined with the image such that color characteristics associated with the image do not interfere with the readability of the bar code symbol. The bar code symbol and image are applied to a product package of the business entity, wherein the image conveys promotional information that is related to the product.

According to another embodiment of the present invention, a method of generating a composite image that is readable by a bar code scanner device is provided. The method comprises receiving an image comprising a first and a second region, and receiving a bar code symbol having a bar pattern and a space pattern. Color values associated with the first region and the bar pattern, and the second region and the bar pattern are processed. The first region is combined with the bar pattern, wherein the bar pattern having the processed color values that is combined with the first region having the processed color values is readable by the bar code scanner device. The second region is combined with the space pattern, wherein the second region having the processed color values that is combined with the space pattern having the processed color values is unreadable by the bar code scanner device.

According to another embodiment of the present invention, a method of generating a composite image scanable by a bar code scanner device is provided. The method comprises receiving a bar code symbol having a bar pattern and a space pattern, and receiving an other image. The dimension values associated with the other image and the bar code symbol are processed such that the image is dimensionally proportional to the bar code symbol. The other image and the bar code symbol are combined, and the color characteristics of the other image are manipulated such that the interference of the image with the readability of the bar code symbol by the bar code scanner device is minimized.

According to another embodiment of the present invention, a method of generating an authenticated composite image that is readable by a bar code scanner device is provided. The method comprises receiving a bar code symbol having a bar and space pattern, and receiving an image comprising a reversed bar and space pattern. The bar and space pattern associated with the bar code symbol is combined with the reversed bar and space pattern associated with the image, wherein the reversed bar and space pattern provide an integrity check for the bar code symbol that allows a visual determination of at least one of the group consisting of at least one missing bar and at least one missing space.

According to another embodiment of the present invention, a method of generating a composite image scanable by a bar code scanner device is provided. The method comprises receiving a bar code symbol having a bar pattern and a space pattern, and receiving an other image. The dimension values associated with the other image and the bar code symbol are processed such that the other image is dimensionally proportional to the bar code symbol. The other image and the bar code symbol are combined. The color characteristics of the other image are processed based on color sensitivity values associated with the bar code scanner device, wherein manipulating the color characteristics of the other image comprises representing the image as a plurality of pixels each of which is represented by a red, a green, and a blue color value. The red, green, and blue color value of each of the plurality of pixels associated with the other image are processed in consideration of the bar code scanner sensitivity values such that the bar code symbol is machine readable by the bar code scanner device and the other image can be optically discerned by a human.

According to another embodiment of the present invention, a method of generating a composite image scanable by a bar code scanner device is provided. The method comprises receiving a bar code symbol having a bar pattern and a space pattern, and receiving an other image. The dimension values associated with the other image and the bar code symbol are processed such that the other image is dimensionally proportional to the bar code symbol. The other image and the bar code symbol are combined. The color characteristics of the other image is processed based on color sensitivity values associated with the bar code scanner device, wherein manipulating the color characteristics of the other image comprises representing the image as a plurality of pixels each of which is represented by a cyan, a magenta, a yellow, and black color value. The cyan, the magenta, the yellow, and the black color value of each of the plurality of pixels associated with the other image are processed in consideration of the bar code scanner sensitivity values such that the bar code symbol is machine readable by the bar code scanner device and the other image can be optically discerned by a human.

According to another embodiment of the present invention, a method implemented by a computer of generating a composite image scanable by a bar code scanner device is provided. The method comprises receiving at the computer a bar code symbol having a bar pattern and a space pattern, and receiving at the computer an other image. The dimension values associated with the other image and the bar code symbol are processed at the computer such that the other image is dimensionally proportional to the bar code symbol. The other image and the bar code symbol are combined at the computer. The color characteristics of the other image are processed at the computer based on color sensitivity values associated with the bar code scanner device, wherein manipulating the color characteristics of the other image comprises representing the image as a plurality of pixels each of which is represented by a red, a green, and a blue color value. The red, green, and blue color value of each of the plurality of pixels associated with the other image are processed in consideration of the bar code scanner sensitivity values such that the bar code symbol is machine readable by the bar code scanner device and the other image can be optically discerned by a human.

According to another embodiment of the present invention, a method implemented by a computer of generating a composite image scanable by a bar code scanner device is provided. The method comprises receiving at the computer a bar code symbol having a bar pattern and a space pattern, and receiving an other image. The dimension values associated with the other image and the bar code symbol are processed at the computer such that the other image is dimensionally proportional to the bar code symbol. The other image and the bar code symbol are combined at the computer. The color characteristics of the other image are processed at the computer based on color sensitivity values associated with the bar code scanner device, wherein manipulating the color characteristics of the other image comprises representing the image as a plurality of pixels each of which is represented by a cyan, a magenta, a yellow, and black color value. The cyan, the magenta, the yellow, and the black color value of each of the plurality of pixels associated with the other image are processed in consideration of the bar code scanner sensitivity values such that the bar code symbol is machine readable by the bar code scanner device and the other image can be optically discerned by a human.

According to another embodiment of the present invention, a method of generating a composite image comprising a bar code symbol and an other image is provided, where the bar code symbol has a plurality of bar regions and space regions, and the composite image is scanable by a bar code scanner device. The method comprises processing the visual characteristic of the other image such that the other image comprises a translucent characteristic. The other image having the translucent characteristic is combined with the bar code symbol, wherein the other image having the translucent characteristic that is combined with the bar code symbol is readable by the bar code scanner device.

According to another embodiment of the present invention, a method implemented by a computer of generating a composite image comprising a bar code symbol and an other image is provided, where the bar code symbol has a plurality of bar regions and space regions, and the composite image is scanable by a bar code scanner device. The method comprises processing at the computer the visual characteristic of the other image such that the other image comprises a translucent characteristic. The other image having the translucent characteristic is combined at the computer with the bar code symbol, wherein the other image having the translucent characteristic that is combined with the bar code symbol is readable by the bar code scanner device.

According to another embodiment of the present invention, a computer system for generating a composite image is provided, where the composite image comprises an other image and a bar code symbol having a plurality of bars and a background region that is readable by a bar code scanner device. The computer system comprises a means for processing color values associated with the other image and the bar code symbol, and bar code scanner sensitivity values associated with the bar code scanner device. A means for combining the bar code symbol with the other image is provided, wherein the bar code symbol having the processed color values that is combined with the other image having the processed color values is readable by the bar code scanner device.

According to another embodiment of the present invention, a computer program product is provided, wherein the computer program product comprises a computer usable medium having computer readable code embodied therein, the computer readable code, when executed, causing a computer to implement a method for providing at least one user with access to a plurality of computer resources, at least some of which utilize distinct protocols for receiving security information and for providing access to outside systems based on received security information. The method comprises processing color values associated with an image and a bar code symbol, and bar code scanner sensitivity values associated with the bar code scanner device, the bar code symbol having a plurality of bars and a background region; and combining the bar code symbol with the other image; wherein the bar code symbol having the processed color values that is combined with the other image having the processed color values is readable by the bar code scanner device.

According to another embodiment of the present invention, a composite image comprises a bar code symbol and an image combined with the bar code symbol, wherein the image does not interfere with the readability of the bar code symbol.

BRIEF DESCRIPTION OF DRAWINGS

The invention is illustrated in the figures of the accompanying drawings, which are meant to be exemplary and not limiting, and in which like references are intended to refer to like or corresponding parts.

FIG. 3 illustrates an operational flowchart according to an embodiment of the present invention;

DETAILED DESCRIPTION

Figure 1:
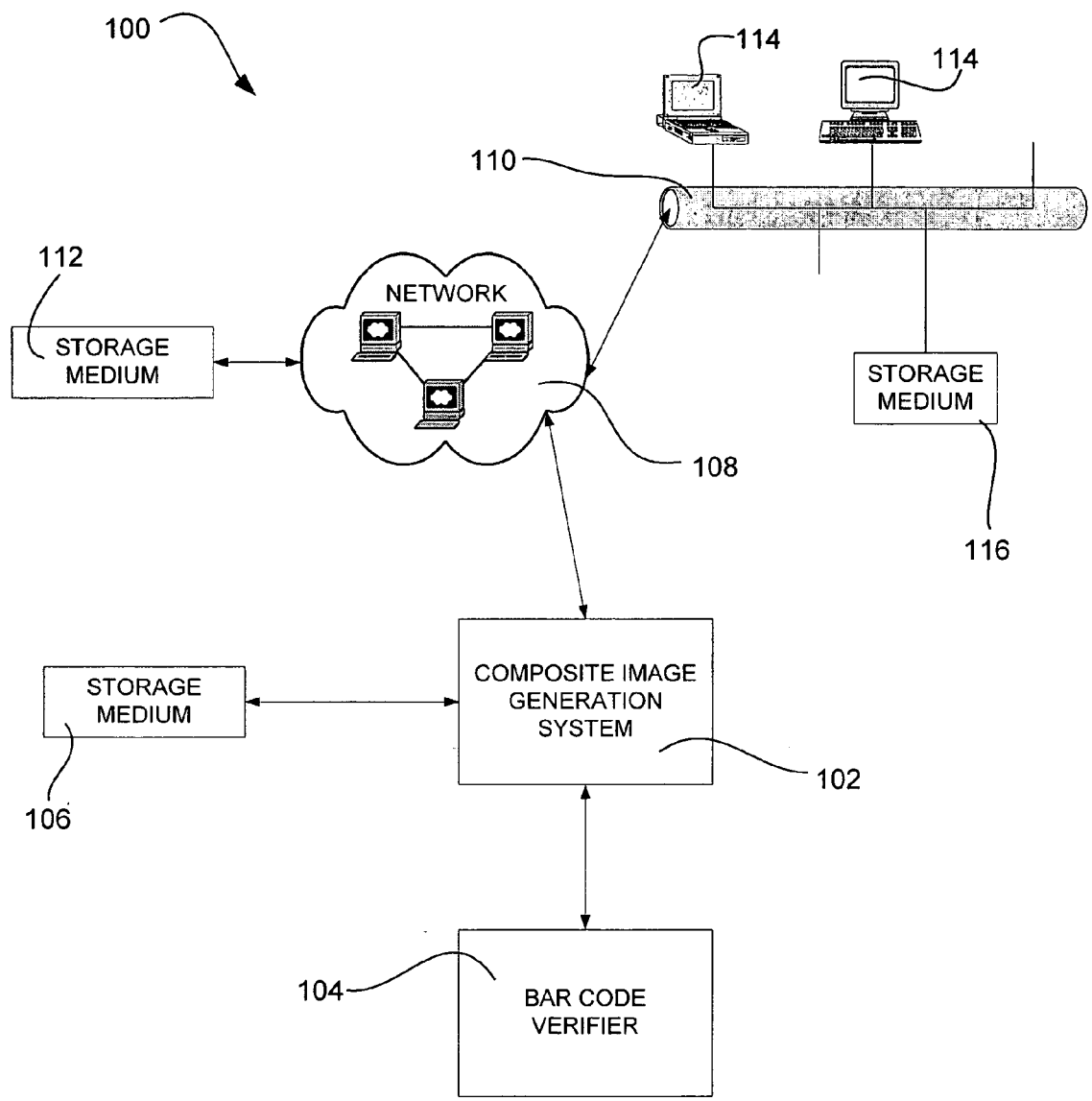
FIG. 1 is a system diagram of an embodiment of the invention.

FIG. 1 illustrates a system 100 according to an embodiment of the present invention, where a composite image generation system (CIGS) 102 comprising a computer system is in communication with a bar code verifier 104, storage medium 106, a communications network 108, such as the Internet, and another communications network 110, such as an Ethernet. The computer system may include one or more computer devices. The computer system may also be comprised entirely from software, entirely from hardware, or both hardware and software. System 102 comprises a computer program that may reside on any computational or processing device having the capability to run or execute a program. CIGS system 102 may download the computer program from a remote location or may directly load the program from a CD-ROM or other such storage medium (e.g., floppy disk, memory card, etc.). For example, the computer program may be downloaded from storage medium 112 over communications network 108. Storage medium 112 may be, for example, a database or server device that is accessible over communications network 108. The computer program may also be accessed and run from an Internet browser by various computer devices 114 residing on network 110 that have authorization to access CIGS system 102 remotely. When the computer program is accessed from an Internet browser, the system 102 running the program may function as a computer server. The program may also be stored in a storage medium 116 and accessed over network 110, by computer devices 114.

Figures 2A, 2B:
FIGS. 2a and 2b illustrate a bar code symbol and image according to an embodiment of the invention.

The computer program running on system 102 generates bar code symbols that are combined with images, such as, but not limited to, photographs, company logos (e.g., Logo), brands, symbols, promotional text/messages, or corporate marks. These images may, for example, be created from within the computer program, downloaded, or accessed from an external storage device. An image and bar code symbol may be processed by the computer program running on system 102, or another processing device (e.g., computers 114) running the program either remotely or locally, in order to ensure that the image does not interfere with the ability of a bar code scanner to read the combined bar code symbol and image. For example, FIG. 2*a* illustrates an image, such as the "Trademark" logo 200. According to an aspect of the present invention, "Trademark" logo 200 may be image processed and combined with the bar code symbol 202, generating a composite image, as illustrated in FIG. 2*b*. Once the image 200 has been processed, the readability or scanability of the bar code symbol 202 is not affected.

As illustrated in FIG. 1, the images accessed or loaded by the computer program may be accessed from various storage media (e.g., storage media 106, 116, or 112) as, for example, a source file. For example, storage medium 106 may be a dedicated repository of images that is accessible by authorized users of the computer program running on system 102 (e.g., registered users of software and system). Storage medium 106 may also include a local storage device for saving user generated combined bar code symbols having one or more images of a desired logo (e.g., image shown in FIG. 2*b*). These generated combined bar code symbols and images may be saved as graphic files, such as TIFF, JPEG, GIF, EPS, or PDF files. Other alternative storage media such as storage medium 112 and 116 may also be used for storing and retrieving such generated combined bar code symbols and images.

According to the embodiment of FIG. 1, flowchart 300 illustrated in FIG. 3 shows an example of the functional method employed by the computer program of system 102 (FIG. 1) in generating composite images such as the composite image illustrated in FIG. 2*b*. At step 302, the software program receives (i.e., locally or remotely) the image of a desired graphic (e.g., logo, brand, text, symbol, promotional message, etc.) as an accessed or loaded computer readable file (e.g., digitized image). At step 304, a bar code symbol is also received as, for example, a loaded file or a download from a stored location. We use bar code symbol here to mean any bar code symbol that is readable by a bar code scanner device, such as, a linear bar code, a two-dimensional bar code, or a Composite Symbology bar code, e.g., a Reduced Space Symbology (RSS) bar code. At step 306, the image is processed in order to determine its color characteristics. For example, the red, green, and blue color values associated with each pixel of the image are determined. The number of pixels corresponding to the image depends on the resolution of the digitized image that is received. The program may optionally vary the resolution of the provided image based on user preferences.

At step 308, the red, green, and blue color sensitivity values (e.g., detectable visible wavelength components) of the bar code scanner are processed by determining them, for example, from either an external storage medium, or from within the computer program running on system 102 (FIG. 1). Bar code scanners typically operate in the shorter wavelength region (650 nm region) of the visible color spectrum (blue/black region), as they are designed to read the blue/black bars associated with bar code symbols. The processing may also involve determining the red, green, and blue (RGB) values of the received bar code symbol in order to ensure that they fall within the color sensitivity values (e.g., detectable visible wavelength components) of the bar code scanner and are, thus, detectable. The RGB values of the bar code symbol may also be determined in order to detect whether the bar code symbol has a background color (e.g., color of bar code symbol's spaces) that may significantly render the image visually undetectable, or even discernable. For example, in the case of a red bar code background and a red colored logo, the image may not stand out against the red background.

At step 310, for each pixel of the received image, the respective Red, Green, and Blue (RGB) values are compared and computed relative to the Red, Green, and Blue (RGB) color sensitivities of the bar code scanner. For example, a Root-Mean-Square (RMS) error calculation may be carried out based on the RGB values of both the accessed image and the bar code scanner sensitivity values for each pixel. Other digital signal processing and image processing techniques may be employed in order to detect the color difference between the bar code scanner's range of optical detection and the provided image. Similarly, it may also be possible to use a CMYK (Cyan, Magenta, Yellow, Black) color model in place of the RGB color system. Thus, for each pixel of the received image, the respective Cyan, Magenta, Yellow, and Black (CMYK) color values are processed relative to CMYK color sensitivities of the bar code scanner. With the CMYK color system, as the yellow and magenta color values of the received image are undetectable by the bar code scanner, color manipulation may only be applied to the black and cyan color components that are detectable by the bar code scanner.

In detecting the color difference between the bar code scanner's range of optical detection and the received image, to ensure readability of the bar code symbol, there should be at least a 50% color contrast difference between the image and, for example, the blue or black color content of the plurality of bars (bar pattern) associated with the bar code symbol. Whatever ranges of bar code color a bar code scanner is designed to detect, the image contrast should be at least approximately 50% of the bars of the bar code, which are read by the bar code scanner. RGB values of the bar code symbol may also be used in order to determine whether the bar code symbol background (e.g., color of bar code symbol's spaces) has at least enough contrast relative to the RGB values of the image. This is to ensure that the image is sufficiently visible against the background of the bar code symbol.

At step 312, it is determined whether there is a sufficient difference in contrast (e.g., 50%) between the RGB colors associated with the image and the RGB values associated with the bar code scanner's detectable range. If this difference is sufficient (e.g., 50%) to ensure that the image will not interfere with the readability of the bar code symbol by the bar code scanner, at step 314, if desired, the dimensions of the image are processed so that the image falls within an optionally specified boundary or region associated with the bar code symbol. For example, if the image is found to be yellow or red, it may not interfere with readability of the bar code scanner device, as the bar code scanner is sensitive to reading shorter wavelengths corresponding to darker colors such as blue and black. Therefore, the red or yellow image may appear invisible to the bar code scanner device.

Resizing the image relative to the bar code symbol may be carried out by measuring the height and width dimensions of both the image and the bar code symbol. The percentage difference between the height of the image and the height of the bar code symbol may be calculated and used as a resizing factor for reducing or enlarging the height dimension of the image with respect to the height dimension of the bar code symbol. For example, if it is determined that the height of the image is 20% of the height of the bar code symbol, either the image height is increased by 80%, or the bar code symbol height is reduced by 80% in order for the image and bar code symbol height to be relatively proportional with respect to each other (e.g., 1:1 scale). Similarly, the percentage difference between the width of the image and the width of bar code symbol may be calculated and used as a width resizing factor for reducing or enlarging the width dimension of the image with respect to the width of the bar code symbol. For example, if it is determined that the width of the image is 20% of the width of the bar code symbol, either the image width is increased by 80%, or the bar code symbol width is reduced by 80% in order for the image and bar code symbol to be relatively proportional with respect to each other (e.g., 1:1 scale). Manual adjustments to the image size and other visual effects may be performed by a user of the computer program. These optional visual effects should not, however, conflict with any image processing that is carried out in order to avoid the image and bar code symbol from interfering in manner that affects the correct readability or scanability of the bar code symbol.

At step 316, the bar code symbol is combined with the processed image, generating a composite bar code symbol and image, as illustrated in the example shown in FIG. 2b. Once a composite image such as a combined bar code symbol and image is produced, bar code verifier 104 (FIG. 1) may be used to evaluate the readability of the bar code symbol that has been combined with the processed image. The bar code verifier 104 (FIG. 1) generates a grade that is indicative of the quality of the bar code symbol based on its readability. If the bar code verifier device 104 fails to read a newly created combined bar code symbol having an image, the image threshold (e.g., contrast level) and/or reference data (e.g., bar code sensitivity values) used by the computer program (FIG. 2) may need re-calibrating in order to ensure readability of the bar code symbol.

Figure 4:
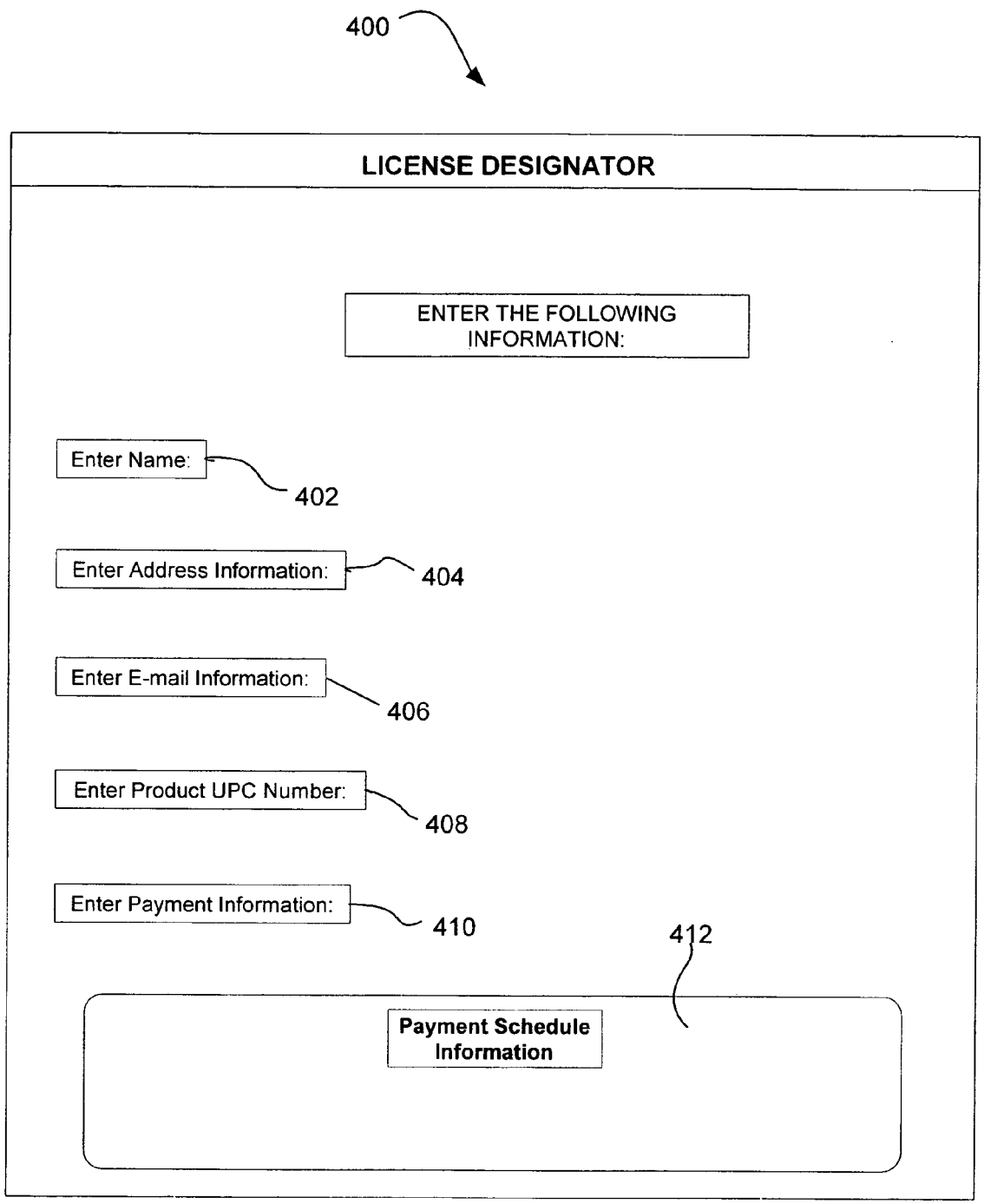
FIG. 4 illustrates a data entry screen for purchasing a licensing agreement according to an embodiment of the present invention.

At step 318, the combined bar code symbol having the image (e.g., FIG. 2b) may be stored on a storage medium such as a hard drive, floppy disk, CD-ROM disk, and/or any other data storage device. In order for the bar code symbol having the image to be successfully saved (e.g., as a graphic file), at step 320, the user may be optionally prompted to execute a licensing agreement associated with the generated combined bar code symbol and image. If so, the program my run a licensing application program that allows a user or users to purchase such an agreement by entering relevant data in a license purchasing screen (FIG. 4). Other operations, such as, a PRINT operation may also invoke the licensing application program. This may restrict the unauthorized production and circulation of combined bar code symbols and images prior to the purchase of a valid license.

FIG. 4 illustrates an example of a license purchasing screen 400 for purchasing a licensing agreement according to an embodiment of the present invention. Purchasing screen 400 prompts a user or potential licensee to enter information such as potential purchasers name 402, address information 404, E-mail information 406, product number 408 (e.g., UPC number), and payment information that is related to the license purchase 410. The screen 400 also displays a payment schedule 412 that informs the user of the cost of purchasing the license. This cost may depend on various factors, such as the number of licenses required.

Returning to FIG. 3, if at step 312, it is determined that there is not a sufficient contrast difference (e.g., 20%) between the RGB colors associated with the image pixels and the RGB sensitivity values associated with the bar code scanner (e.g., image will interfere with the readability of the bar code symbol), continued processing of the image will continue at step 310. For example, if one or more of the image pixels include dark blue or black color characteristic and may fall within a space region of a bar code symbol, there will be a low contrast difference between these pixels and the RGB sensitivity values associated with the bar code scanner. As the bar code scanner is sensitive to darker colors such as blue and black, it is, therefore, likely that the image pixels closer to these colors (e.g., blue or black) will interfere with the readability of the scanner device, which is sensitive to reading these wavelengths. Image processing may include manipulating the color characteristics (e.g., contrast, saturation, hue, etc.) for these pixels so that such interference with the readability of the bar code scanner may be eliminated.

For example, a company logo may be blue, which may fall within the detectable wavelength of the bar code scanner device. Areas or regions of the logo that fall within the bar pattern of the bar code symbol may not need color characteristic manipulation. However, the areas of the logo that fall within the background region or spaces between the bars may need to be manipulated as they will be detected and read by the scanner device. Thus, one or more space regions may falsely register as a detected bar by the bar code scanner device. In order to maintain the blue visual appearance, the color contrast of the logo may be reduced relative to the blue or black color components that are detectable by the bar code scanner device. This may be achieved by adding a white color component to the blue logo in order to reduce its contrast to at least 50% of the blue or black color components that are readable by the bar code scanner device.

The same result may also be achieved by creating a bar code symbol having a plurality of bars or bar pattern on, for example, a white translucent background. By combining the bar code symbol and the image, as the spaces between the bars are translucent, the image that is underlying the bar code symbol will have a minimum (e.g., 50%) contrast that is sufficient to ensure that portions of the image under the translucent spaces will not be detected or read by the bar code scanner. In effect, the translucent background adds a white color component to the underlying image colors, thus manipulating the image's contrast to the point that the image may not interfere with the readability of the bar code scanner (e.g., blue and black colors).

In certain situations, the processing may, for example, comprise determining the darker image pixels (e.g., dark blue) that may appear in the bar regions of a bar code symbol. These image pixels may not, however, interfere with the readability of the bars, as the contrast between the bars and darker pixels are low, which allows the bar code scanner to read the bars regardless of if whether such image pixels were to appear within the bar regions of the bar code symbols.

Another example of processing the image pixels may include converting the image to a grey tone appearance, where the saturation may be varied between 0–40%. When converting the image to a grey tone, sufficient contrast difference between the image and bar code symbol color should exist in order to ensure the readability of the bar code symbol by the bar code scanner. Readability of the bar code symbol is contingent upon correctly reading the product code associated with the bar code.

Figure 5A:
FIGS. 5a, 5b, and 5c illustrate examples of image positions and display characteristics relative to the bar code symbol according to an embodiment of the present invention.
Figure 5B:
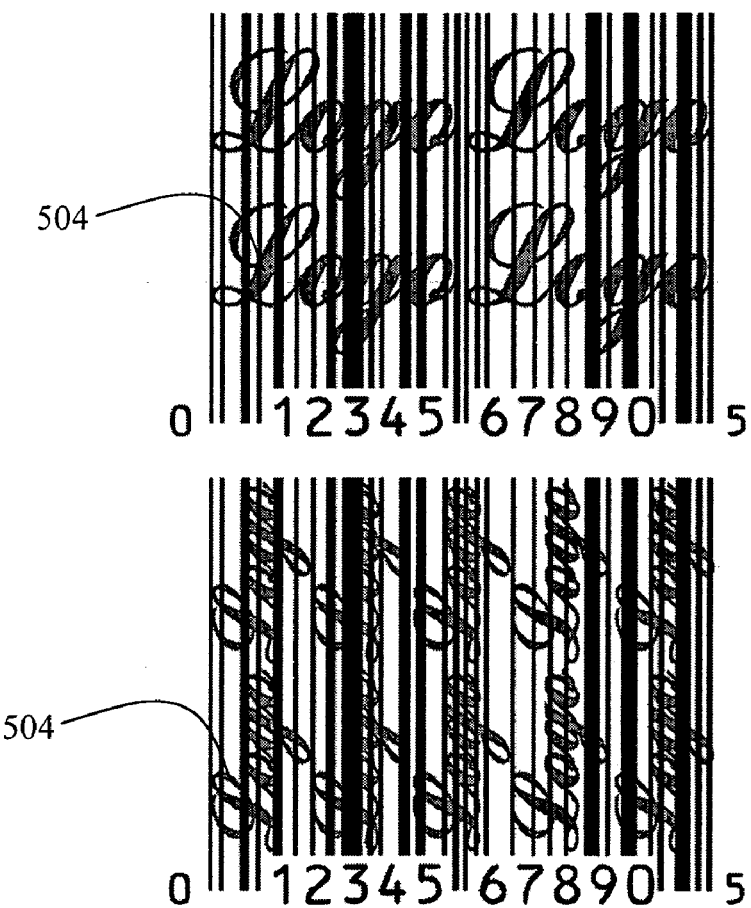
Figure 5C:

At step 314 (FIG. 3), the orientation and dimensions of the image relative to bar code symbol may be adjusted based on user preferences. Examples of such variations are shown in FIGS. 5a, 5b, and 5c. In FIG. 5a, bar code symbol 502 is combined with image 500, such that the image 500 size is maximized relative to boundaries of the bar code symbol 502. In FIG. 5b, the image 504 (i.e., Logo) is tiled in the manner shown in the figure. FIG. 5c shows an image 508 that has been positioned within a space region 510 of the bar code symbol 512. In the illustrated example, as the processed image 508 is red, it will not interfere with the readability of the bar code scanner device, since the bar code scanner device cannot read this color wavelength. If, for example, the image 508 was a dark blue, the scanner may have read this as a bar, thus, generating reading or scanning errors. Therefore, if image processing of the image 508 and bar code symbol 512 was to indicate a low contrast difference between the bar code scanner sensitivity values and the image pixel colors, the image pixel color characteristics may be varied in order to ensure the readability of the bar code scanner.

In the example of FIG. 5c, it may be possible to superimpose the processed image onto the space region 510 of bar code symbol 512. Alternatively, the bar code symbol may also be superimposed onto the processed image. Therefore, in some instances, the bar code symbol and image may be combined by superimposing a bar code symbol onto an image, or superimposing the image onto the bar code symbol. It may also be possible to either process the image before combining the bar code symbol and image, or following combining the bar code symbol and image.

Figure 6:
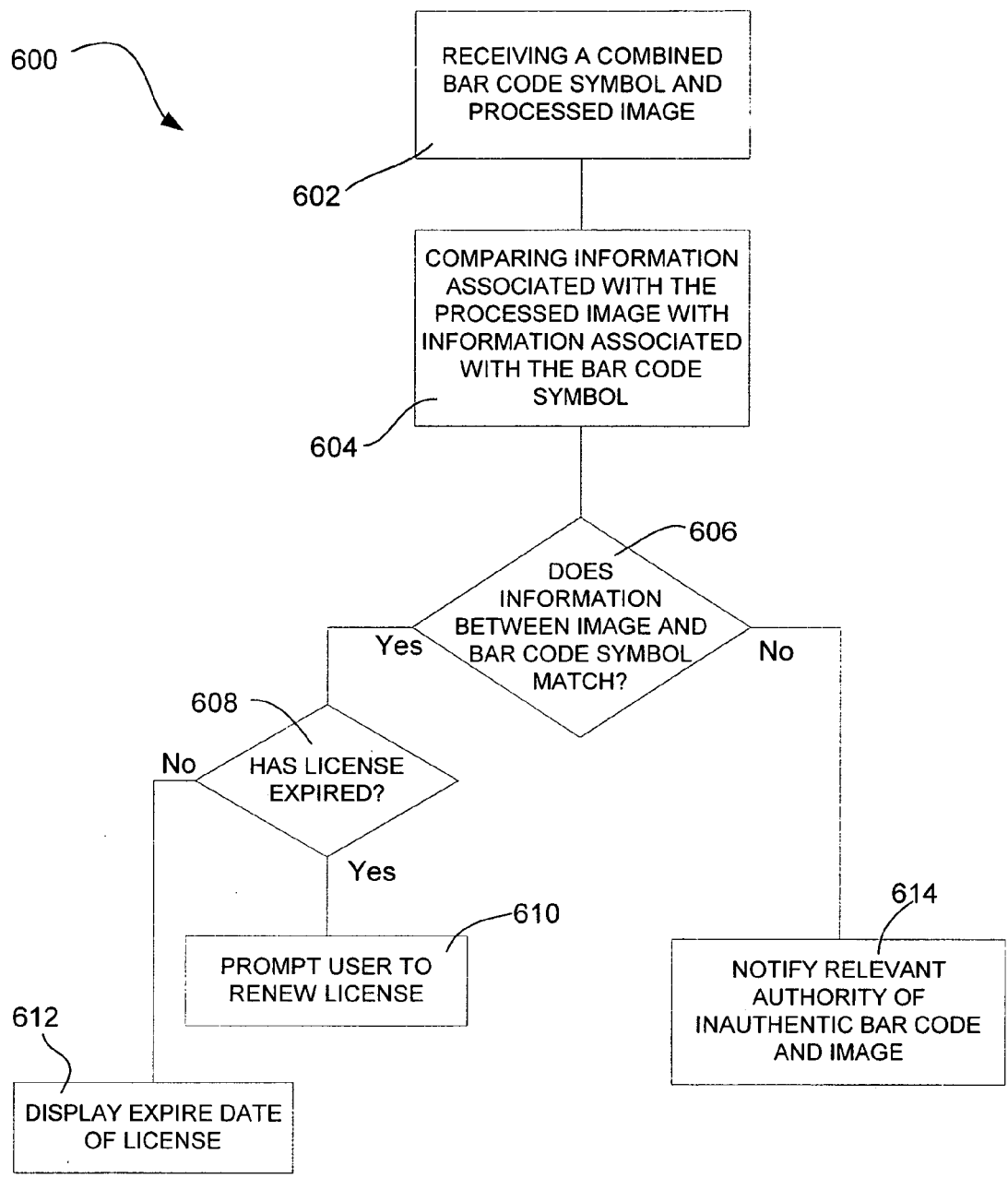
FIG. 6 illustrates a flowchart for detecting misuse of a bar code symbol according to an embodiment of the invention.

FIG. 6 illustrates an operational flowchart 600 for detecting misuse of the bar code symbol by the computer program running on system 102 (FIG. 1) according to an embodiment of the invention. At step 602 a combined bar code symbol and image is received by, for example, loading from a local storage or downloading from a remote location. At step 604, information associated with the image (e.g., logo or brand affiliation etc.) and information (e.g., UPC number, manufacturer information, etc.) associated with the bar code symbol are compared. If at step 606 it is determined that the information associated with the image and the bar code symbol do not match, at step 614, the relevant authorities may be notified (e.g., E-Mail, etc.) by the computer program. If at step 608 it is determined that the bar code symbol and image do in fact match, at step 608 it is determined whether a licensing agreement has been purchased, or whether the current licensing agreement has expired. If a licensing agreement has not been purchased, or the current licensing agreement has expired, at step 610 the user is prompted to renew or purchase a new license. If the current license is still valid, at step 612 the expiry date of this license may be displayed as a reminder.

Figure 7:
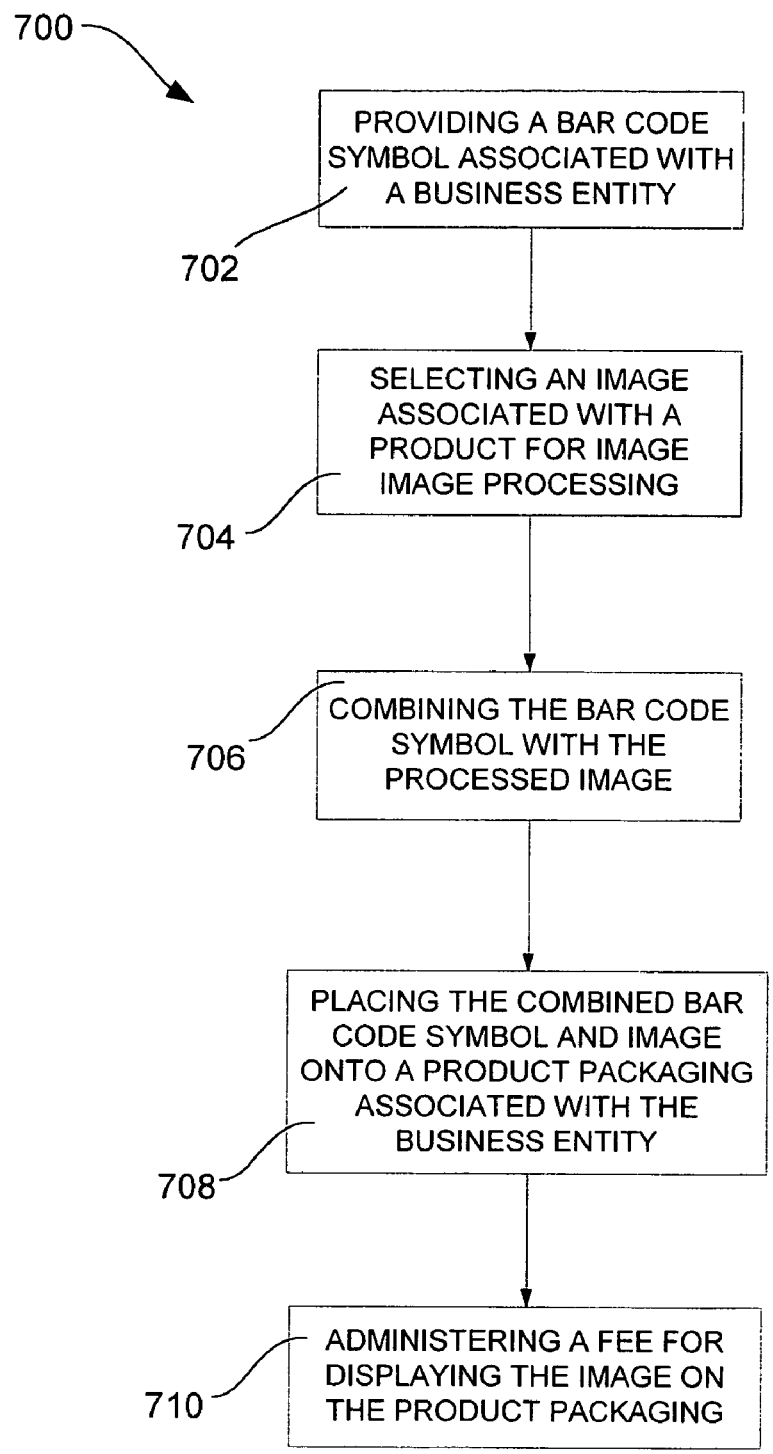
FIG. 7 illustrates a flowchart for advertising and marketing an image according to an embodiment of the invention.

FIG. 7 illustrates another flowchart 700 for generating advertising or marketing information or promotions according to an embodiment of the present invention. At step 702 a bar code symbol associated with a business entity (e.g., perfume manufacturer) is provided. At step 704 an image of a logo, brand, text, promotional message, or mark associated with a product is selected for marketing or advertisement. At step 706 the bar code symbol associated with the business entity image is combined with the image. At step 708 the combined bar code symbol and image is placed on the product packaging of the business entity. Based on this, the party or parties interested in advertising or marketing the product may pay the business entity a fee, as indicated in step 710.

Figure 8A:
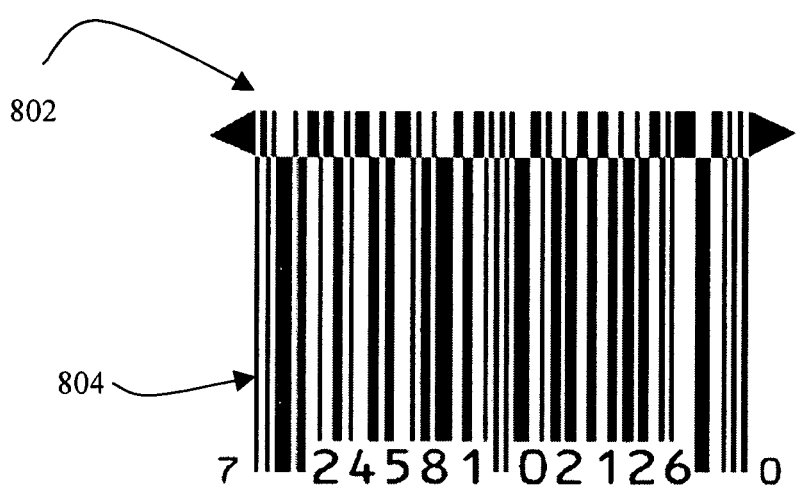
FIGS. 8a–8f illustrate examples of images that indicate the boundaries of a bar code symbol according to an embodiment of the invention.
Figure 8B:
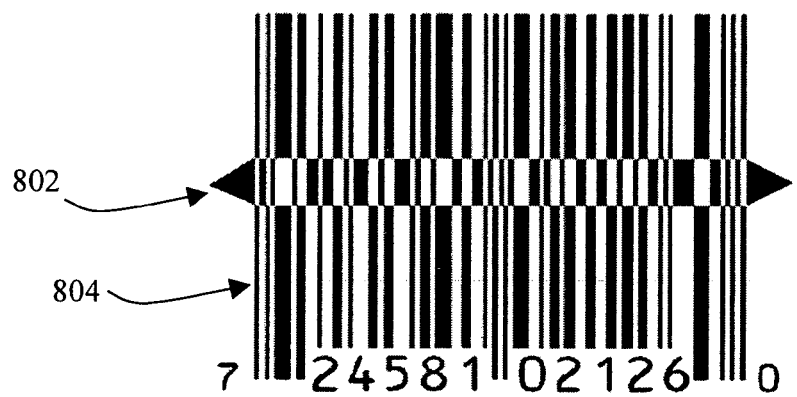
Figure 8C:
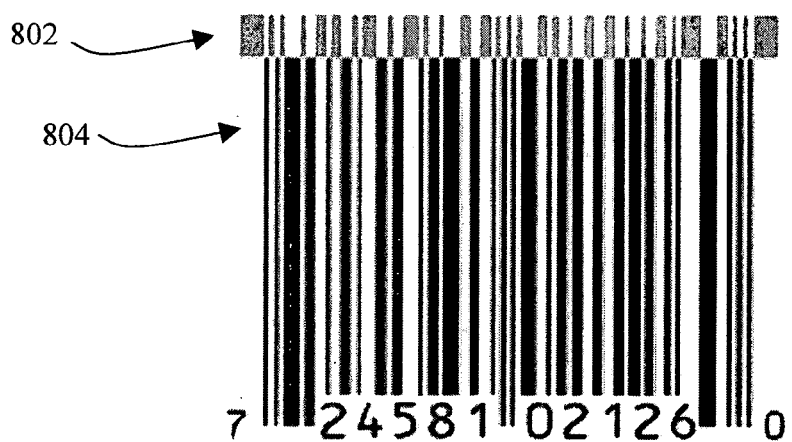
Figure 8D:
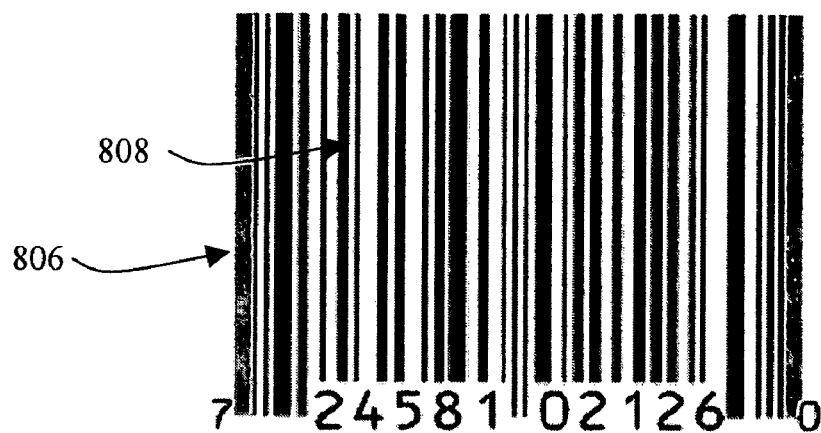
Figure 8E:
Figure 8F:
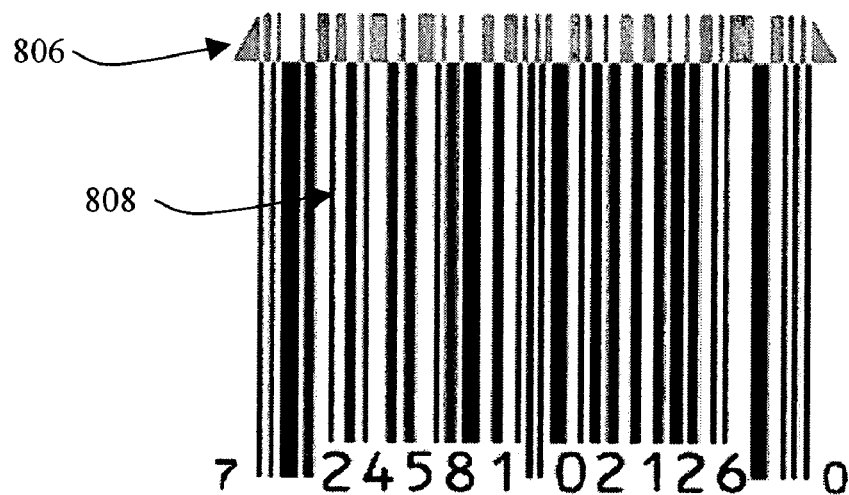

FIGS. 8a–8f illustrate various examples of images that may be used to check the integrity of bar code symbols according to an embodiment of the invention. FIGS. 8a–8c illustrate reverse space/bar regions 802 that have a space/bar pattern that is the inverse of the bar code symbol patterns 804. If the reverse space/bar regions 802 and bar code symbol patterns 804 do not match, it is an indication that the bar code symbol may have been corrupted. FIGS. 8d–8f illustrate images 806 that mark the boundaries of the bar code symbols 808 for ensuring that sections (bar/space markings) have not been added or removed from the bar code symbols.

Figure 9:
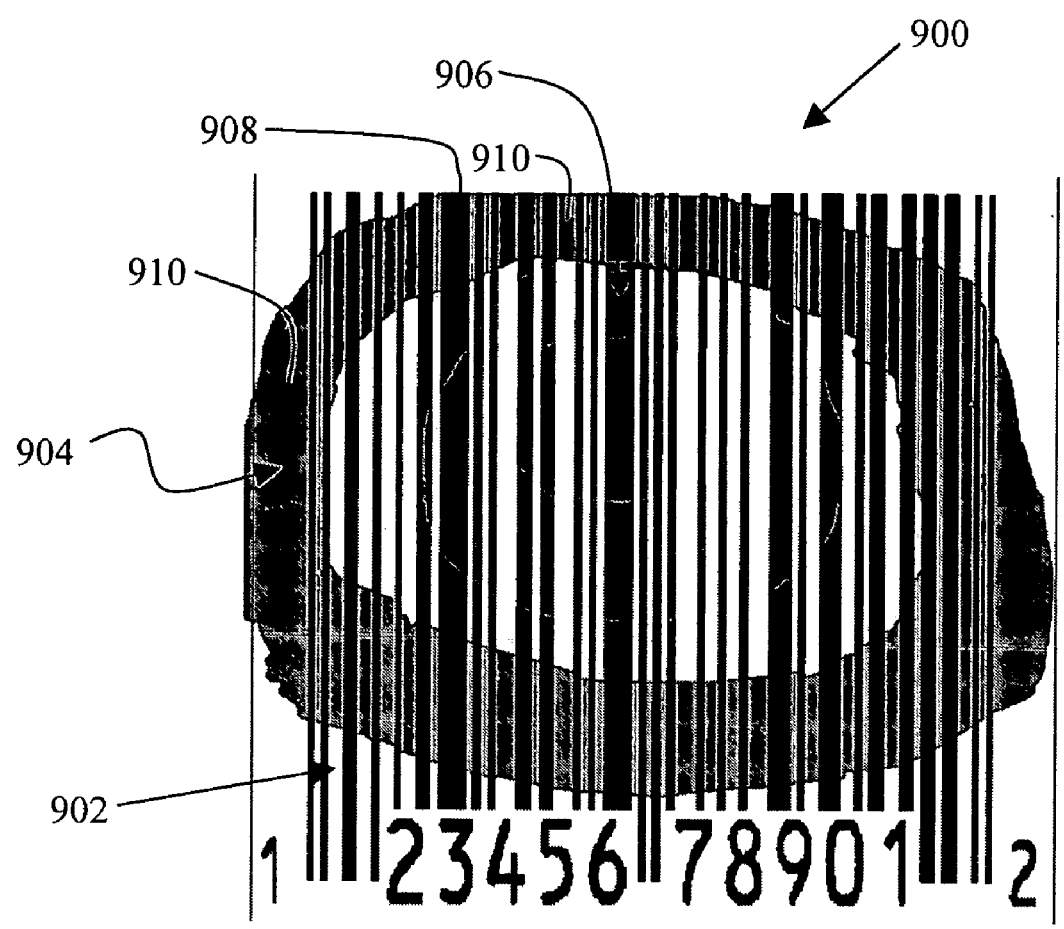
FIG. 9 illustrates an example of a composite bar code symbol and image according to another embodiment of the invention.

FIG. 9 illustrates another example of a combined bar code symbol and image according an embodiment of the invention. A composite image, such as, combined bar code symbol and image 900 comprises bar code symbol 902, image portion 904, and image portion 906. Bar code symbol 902 comprises bar pattern 908 and space pattern 910 (e.g., background region). As illustrated, image portion 904 is superimposed by bar code symbol 902, while image portion 906 is superimposed over or embedded within the bar pattern 908 of bar code symbol 902. Provided that the portion of the image 906 that is superimposed over the bar pattern 908 is within the color sensitivity range (e.g., blue, black) of the bar code scanner, the image 906 will not affect the readability of bar pattern 908. If, for example, image region 906 were red or yellow, bar pattern 908 would not be readable, as these colors are not detectable by the bar code scanner device. Therefore, image region 906 would have to be processed and its color values manipulated by the computer program through techniques described above, such that it would not interfere with the readability of the bar pattern 908 associated with bar code symbol 902.

In combining image region 904 with the bar code symbol 902, bar code symbol 902 may be superimposed onto image 904. Alternatively, image 904 may be superimposed onto the bar code symbol 902 by inserting the image 904 within the space pattern 910 of bar code symbol 902. In either case, the color (e.g., red) of the image 904 would have to be, or be manipulated to be, outside the sensitivity range of the bar code scanner. If, for example, portions of this image 904 were to be superimposed onto the bar pattern 908, the color at these locations would have to manipulated to be the same as the color of the bar pattern 908 (e.g., black), or a color (e.g., blue) that would still render the bars 908 readable by the bar code scanner. The image 904 may be processed prior to either being superimposed onto the bar code symbol 902, or prior to having the bar code symbol 902 superimposed onto it. The image 904 may also be processed following being superimposed onto the bar code symbol 902, or following having the bar code symbol 902 superimposed onto it.

In combining image 906 with the bar pattern 908, image 906 may be superimposed onto the bars 908, where color processing (e.g., color comparing and possible color manipulation) may be applied either before or following superposition of the image 906 onto the bar pattern 908. If portions (not shown) of this image 906 were to, for example, lie within the space pattern 910, the color of these portions of image 906 should be processed, such that they are rendered undetectable by the bar code scanner device. It may also be possible to modify the color pixels of the bar pattern 908 in order to incorporate image 906 within the bar pattern 908 of the combined bar code and image 900, as illustrated in the figure.

Figure 10A:
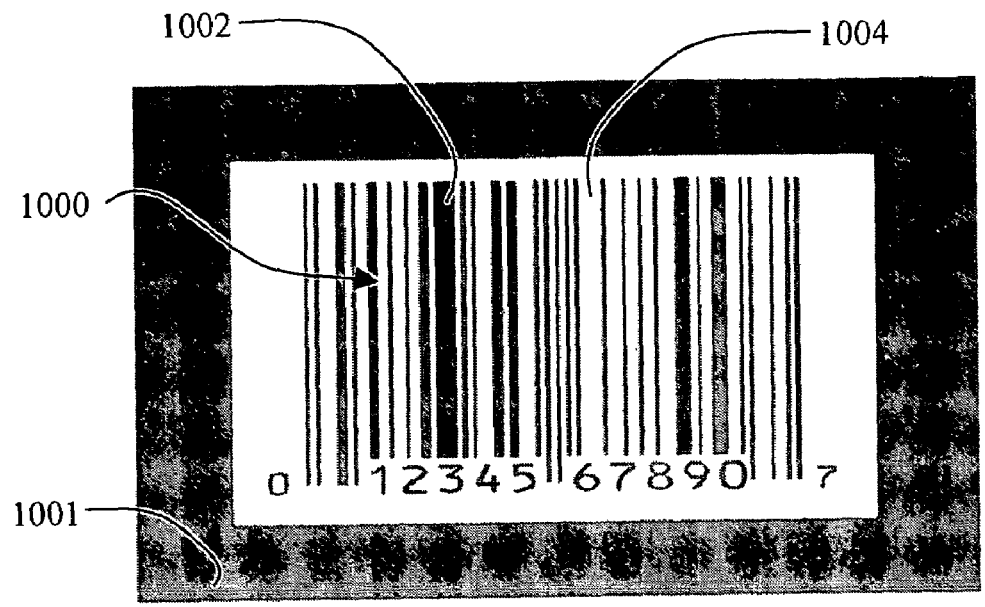
FIG. 10 illustrates an example of yet another composite bar code symbol according to an embodiment of the present invention.
Figure 10B:
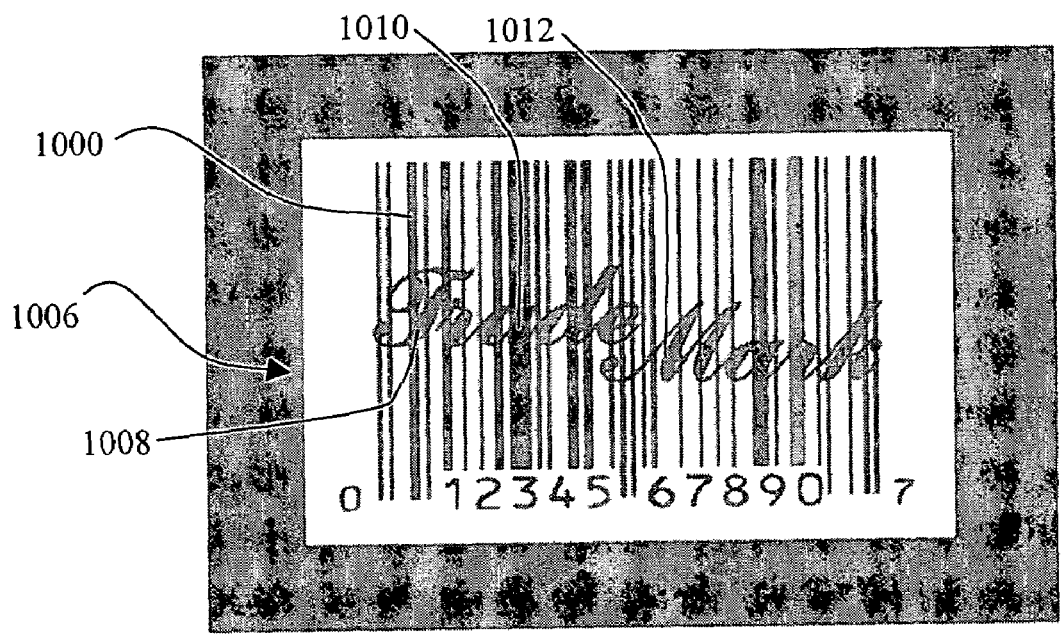

FIGS. 10a and 10b illustrate yet another example of a combined bar code symbol and image according to an embodiment of the invention. In this example, a first layer 1001 has optical properties detectable by a bar code scanner. For example, the first layer 1001 may comprise aluminum, e.g., of a soft drink can, where the color of the aluminum is detectable by a bar code scanner. In the example of FIGS. 10a and 10b, a second layer having optical properties not detectable by a bar code scanner is integrated with the first layer so as to form a bar code symbol 1000. For example, the second layer may comprise a white colored layer, e.g., formed of ink or paint, with spaces corresponding to the bars of a bar code so that when second layer is integrated with, e.g., placed over, the first layer 1001, the portions of the first layer revealed through the spaces of the second layer are detectable as the bar code by a bar code scanner. As illustrated in FIG. 10a, bar code symbol 1000 comprises aluminum bars 1002 on a substantially white background 1004. Hence the space regions are formed by white background 1004. The aluminum bars 1002 are readable by a bar code scanner device, as would be if they were comprised of blue or black color components.

FIG. 10b illustrates a combined bar code symbol and image 1006 comprising a bar code symbol 1000, as illustrated in FIG. 10a, and an image 1008 (e.g., "Trade Mark"). The image 1008 may be translucent to the extent that any portion of an individual bar region 1010 of bars 1002 underlying translucent image 1008 is readable by the bar code scanner device. Where image 1008 is not translucent, it may be processed so as to be made translucent, as described below. The image 1008 and bar code symbol 1000 may also both be visually discernable to the naked eye. The optical wavelength components of light associated with the bars 1002 may pass through the translucent portions of the image 1008 and be detected and registered as a bar region by the bar code scanner device. If, for example, the translucence of the image 1008 is not sufficient for passing or transmitting the optical wavelength components of light associated with the bars 1002, those bar regions that are located in the same region as the image (e.g., region 1010), may not be detected by the bar code scanner device. Processing of the Image 1008 may include, for example, analyzing the visual characteristics of the image 1008 to determine its translucency. Where image 1008 is determined to be of sufficient translucency such that the optical wavelength components of light associated with the bars 1002 may pass through the translucent portions of the image 1008 and be detected and registered as a bar region by the bar code scanner device, then processing of image 1008 may terminate. On the other hand, where the translucency of image 1008 is determined to be insufficient, processing of image 1008 may include additional operations, such as manipulating the image translucence to the extent that sufficient wavelength components of light associated with the bars 1002 pass through the image 1008 and are received by the bar code scanner device for readability. If, for example, image 1008 comprises a translucent color not detectable by a bar code scanner, e.g., red, it should pass the wavelength components associated with the bars 1002 in order to be readable by the scanner device.

It may be necessary, in some instances, to process other color characteristics (e.g., RGB, CMYK components, etc.) of the image 1008 as well as its translucence for purposes of enabling readability by the bar code scanner device. For example, an image that is of a color detected by bar code scanners, e.g., blue, may be manipulated to have enough contrast (e.g., at least 50%) with the bars 1002, such that the portions of the image that lie in the spaces 1004 are not erroneously read by the bar code scanner device. The blue image may also be translucent so that the bars 1002 and spaces 1004 are visually detectable through the image and do not interfere with the readability of the bar code scanner device. In this example (e.g., blue image), the space regions that are located in the same region as the image (e.g., region 1012) should remain undetectable by the bar code scanner device. Therefore, the image may be undetectable by the bar code scanner and pass or transmit the optical wavelength components associated with the bar code symbol 1000 through the translucent image 1008.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

What is claimed is:

1. A method of generating a composite image comprising an other image and a bar code symbol having a plurality of bars and a background region that is readable by a bar code scanner device, the method comprising:
    processing color values associated with the other image and the bar code symbol, and bar code scanner sensitivity values associated with the bar code scanner device; and
    combining the bar code symbol with the other image;
    wherein the bar code symbol having the processed color values that is combined with the other image having the processed color values is readable by the bar code scanner device;
    wherein the other image comprises a plurality of pixels, the plurality of pixels each having a red, a green, and a blue color value, and wherein processing the other image comprises comparing the red, green, and blue color value of each of the plurality of pixels with the bar code scanner sensitivity values.

2. The method according to claim 1, wherein the plurality of bars and background region are scanable by the bar code scanner device.

3. The method according to claim 1, wherein the other image is associated with a product, the product comprising at least one of the group consisting of a goods and a service.

4. The method according to claim 1, wherein the other image comprises at least one of the group consisting of a corporate logo, a product brand, and a promotional advertising message.

5. The method according to claim 1, further comprising adjusting the dimensions of the other image such that the other image fits within an optionally specified region associated with the bar code symbol.

6. The method according to claim 1, wherein a root-mean-square value for each of the plurality of pixels is evaluated for determining an occurrence of readability problems associated with the bar code scanner device.

7. The method according to claim 1, wherein the processing comprises generating the manipulation of color values for each of the plurality of pixels, the red, green, and blue color value for each of the plurality of pixels manipulated such that each pixel color does not interfere with the readability of the bar code symbol by the bar code scanner.

8. The method according to claim 1, wherein the other image comprises a plurality of images that are arranged in a substantially tiled pattern.

9. The method according to claim 1, wherein the combined bar code symbol and other image comprises a variable resolution.

10. The method according to claim 1, wherein the color values of the other image are selectably converted to yellow or red.

11. The method according to claim 1, wherein the other image and the bar code symbol are loaded from a storage medium as a source file.

12. The method according to claim 1, wherein the other image is accessible by creating a customized image.

13. The method according to claim 1, wherein the combined bar code symbol and other image is saved as at least one of the group consisting of a TIFF, a JPEG, a GIF, an EPS, and a PDF graphic file format.

14. The method according to claim 1, wherein the combined bar code symbol and other image is evaluated by a bar code verifier for generating a grade associated with the readability of the combined bar code symbol and other image.

15. The method according to claim 1, wherein combining the bar code symbol and the other image comprises superimposing the bar code symbol onto the other image.

16. The method according to claim 1, wherein combining the bar code symbol and the other image comprises superimposing the other image onto the bar code symbol.

17. A method of generating a composite image comprising an other image and a bar code symbol having a plurality of bars and a background region that is readable by a bar code scanner device, the method comprising:
processing color values associated with the other image and the bar code symbol, and bar code scanner sensitivity values associated with the bar code scanner device; and
combining the bar code symbol with the other image;
wherein the bar code symbol having the processed color values that is combined with the other image having the processed color values is readable by the bar code scanner device, wherein processing the color values of the other image includes converting the other image to a grey tone image by varying saturation values between values of about 0–40%.

18. A method of generating a composite image comprising an other image and a bar code symbol having a plurality of bars and a background region that is readable by a bar code scanner device, the method comprising:
processing color values associated with the other image and the bar code symbol, and bar code scanner sensitivity values associated with the bar code scanner device; and
combining the bar code symbol with the other image;
wherein the bar code symbol having the processed color values that is combined with the other image having the processed color values is readable by the bar code scanner device, wherein processing the color values of the other image includes processing the other image to have at least a 50% color contrast relative to the plurality of bars associated with the bar code symbol.

19. A method of generating a composite image comprising an other image and a bar code symbol having a plurality of bars and a background region that is readable by a bar code scanner device, the method comprising:
processing color values associated with the other image and the bar code symbol, and bar code scanner sensitivity values associated with the bar code scanner device; and
combining the bar code symbol with the other image;
wherein the bar code symbol having the processed color values that is combined with the other image having the processed color values is readable by the bar code scanner device, wherein processing the color values of the other image comprises adding a white color component to at least a portion of the other image so that the color contrast of the portion of the image is at least 50% relative to the plurality of bars associated with the bar code symbol.

20. A method of providing a user with an opportunity to purchase a combined bar code symbol and image, wherein the combined bar code symbol and image are readable by a bar code scanner device, the method comprising:
receiving an other image;
receiving a bar code symbol having a plurality of bars and a background region;
processing color values associated with the other image, the bar code symbol, and bar code scanner sensitivity values associated with the bar code scanner device;
combining the plurality of bars and the background region associated with the bar code symbol with the other image; wherein the bar code symbol having the processed color values that is combined with the other image having the processed color values is readable by the bar code scanner device; and
providing a license purchasing screen for prompting the user to purchase a license associated with the combined bar code symbol and other image upon selection confirmation by the user.

21. The method according to claim 20, wherein selection confirmation includes saving the combined bar code symbol and other image on a storage medium.

22. The method according to claim 20, wherein selection confirmation includes a print command for printing the combined bar code symbol and other image onto a substrate.

23. The method according to claim 22, wherein the substrate includes a printable surface upon which the combined bar code symbol and other image is applied.

24. The method according to claim 20, wherein prompting the user to purchase a license associated with the combined bar code symbol and other image comprises entering purchasing related data into the license purchasing screen.

25. A method of marketing a product comprising:
receiving a bar code symbol that corresponds to a business entity, the bar code symbol having an image associated with the product, wherein the bar code symbol is combined with the image such that color characteristics associated with the image do not interfere with the readability of the bar code symbol;

applying the bar code symbol and image to a product package of the business entity, wherein the image conveys promotional information that is related to the product; and generating a fee for displaying the image associated with the product on the product package of the business entity.

26. The method according to claim 25, wherein the product comprises at least one of the group consisting of goods and a service.

27. A method of generating a composite image that is readable by a bar code scanner device, the method comprising:

receiving an image comprising a first and a second region;

receiving a bar code symbol having a bar pattern and a space pattern;

processing color values associated with the first region and the bar pattern;

processing color values associated with the second region and the bar pattern;

combining the first region with the bar pattern, wherein the bar pattern having the processed color values that is combined with the first region having the processed color values is readable by the bar code scanner device; and combining the second region with the space pattern, wherein the second region having the processed color values that is combined with the space pattern having the processed color values is unreadable by the bar code scanner device.

28. The method according to claim 27, wherein combining the first region with the bar pattern comprises superimposing the first region of the image onto the bar pattern.

29. The method according to claim 27, wherein combining the first region with the bar pattern comprises incorporating the first region within the bar pattern.

30. The method according to claim 27, wherein combining the second region with the space pattern comprises superimposing the first region of the image onto the bar and space pattern and removing areas of the first region that overlap with the bar regions.

31. The method according to claim 27, wherein combining the second region with the space pattern comprises superimposing the bar and space pattern onto the second image such that the second region appears within the space pattern.

32. A method of generating an authenticated composite image that is readable by a bar code scanner device, the method comprising:

receiving a bar code symbol having a bar and space pattern;

receiving an image comprising a reversed bar and space pattern; and combining the bar and space pattern associated with the bar code symbol with the reversed bar and space pattern associated with the image, wherein the reversed bar and space pattern provide an integrity check for the bar code symbol that allows a visual determination of at least one of the group consisting of at least one missing bar and at least one missing space.

33. The method according to claim 32, wherein the reversed bar and space pattern includes a color that does not interfere with the readability of the bar code scanner device.

34. A method of generating a composite image scanable by a bar code scanner device, the method comprising:

receiving a bar code symbol having a bar pattern and a space pattern;

receiving an other image;

processing dimension values associated with the other image and the bar code symbol such that the other image is dimensionally proportional to the bar code symbol;

combining the other image and the bar code symbol; and processing the color characteristics of the other image based on color sensitivity values associated with the bar code scanner device, wherein manipulating the color characteristics of the other image comprises representing the image as a plurality of pixels each of which is represented by a red, a green, and a blue color value, and wherein the red, green, and blue color value of each of the plurality of pixels associated with the other image are processed in consideration of the bar code scanner sensitivity values such that the bar code symbol is machine readable by the bar code scanner device and the other image can be optically discerned by a human.

35. The method according to claim 34, wherein the other image is associated with a product.

36. A method of generating a composite image scanable by a bar code scanner device, the method comprising:

receiving a bar code symbol having a bar pattern and a space pattern;

receiving an other image;

processing dimension values associated with the other image and the bar code symbol such that the other image is dimensionally proportional to the bar code symbol;

combining the other image and the bar code symbol; and processing the color characteristics of the other image based on color sensitivity values associated with the bar code scanner device, wherein manipulating the color characteristics of the other image comprises representing the image as a plurality of pixels each of which is represented by a cyan, a magenta, a yellow, and black color value, and wherein the cyan, the magenta, the yellow, and the black color value of each of the plurality of pixels associated with the other image are processed in consideration of the bar code scanner sensitivity values such that the bar code symbol is machine readable by the bar code scanner device and the other image can be optically discerned by a human.

37. The method according to claim 36, wherein the other image is associated with a product.

38. A method implemented by a computer of generating a composite image scanable by a bar code scanner device, the method comprising:

receiving at the computer a bar code symbol having a bar pattern and a space pattern;

receiving at the computer an other image;

processing at the computer dimension values associated with the other image and the bar code symbol such that the other image is dimensionally proportional to the bar code symbol;

combining at the computer the other image and the bar code symbol; and processing at the computer the color characteristics of the other image based on color sensitivity values associated with the bar code scanner device, wherein manipulating the color characteristics of the other image comprises representing the image as a plurality of pixels each of which is represented by a red, a green, and a blue color value, and wherein the red, green, and blue color value of each of the plurality of pixels associated with the other image are processed in consideration of the bar code scanner sensitivity values such that the bar code symbol is machine readable by the bar code scanner device and the other image can be optically discerned by a human.

39. The method according to claim 38, wherein the other image is associated with a product.

40. A method implemented by a computer of generating a composite image scanable by a bar code scanner device, the method comprising:
  receiving at the computer a bar code symbol having a bar pattern and a space pattern;
  receiving at the computer an other image;
  processing at the computer dimension values associated with the other image and the bar code symbol such that the other image is dimensionally proportional to the bar code symbol;
  combining at the computer the other image and the bar code symbol; and
  processing at the computer the color characteristics of the other image based on color sensitivity values associated with the bar code scanner device, wherein manipulating the color characteristics of the other image comprises representing the image as a plurality of pixels each of which is represented by a cyan, a magenta, a yellow, and black color value, and wherein the cyan, the magenta, the yellow, and the black color value of each of the plurality of pixels associated with the other image are processed in consideration of the bar code scanner sensitivity values such that the bar code symbol is machine readable by the bar code scanner device and the other image can be optically discerned by a human.

41. The method according to claim 40, wherein the other image is associated with a product.

42. A method implemented by a computer of providing a user with an opportunity to purchase a combined bar code symbol and image using a computer program, wherein the combined bar code symbol and image are readable by a bar code scanner device, the method comprising:
  receiving at the computer an other image;
  receiving at the computer a bar code symbol having a plurality of bars and a background region;
  processing at the computer color values associated with the other image, the bar code symbol, and bar code scanner sensitivity values associated with the bar code scanner device;
  combining at the computer the plurality of bars and the background region associated with the bar code symbol with the other image; wherein the bar code having the processed color values that is combined with the other image having the processed color values is readable by the bar code scanner device; and
  providing at the computer a license purchasing screen for prompting the user to purchase a license associated with the combined bar code symbol and other image upon selection confirmation by the user.

* * * * *